July 27, 1937.     R. GINGRAS     2,088,370
AUTOMOBILE SIGNAL
Filed June 22, 1934     2 Sheets-Sheet 1
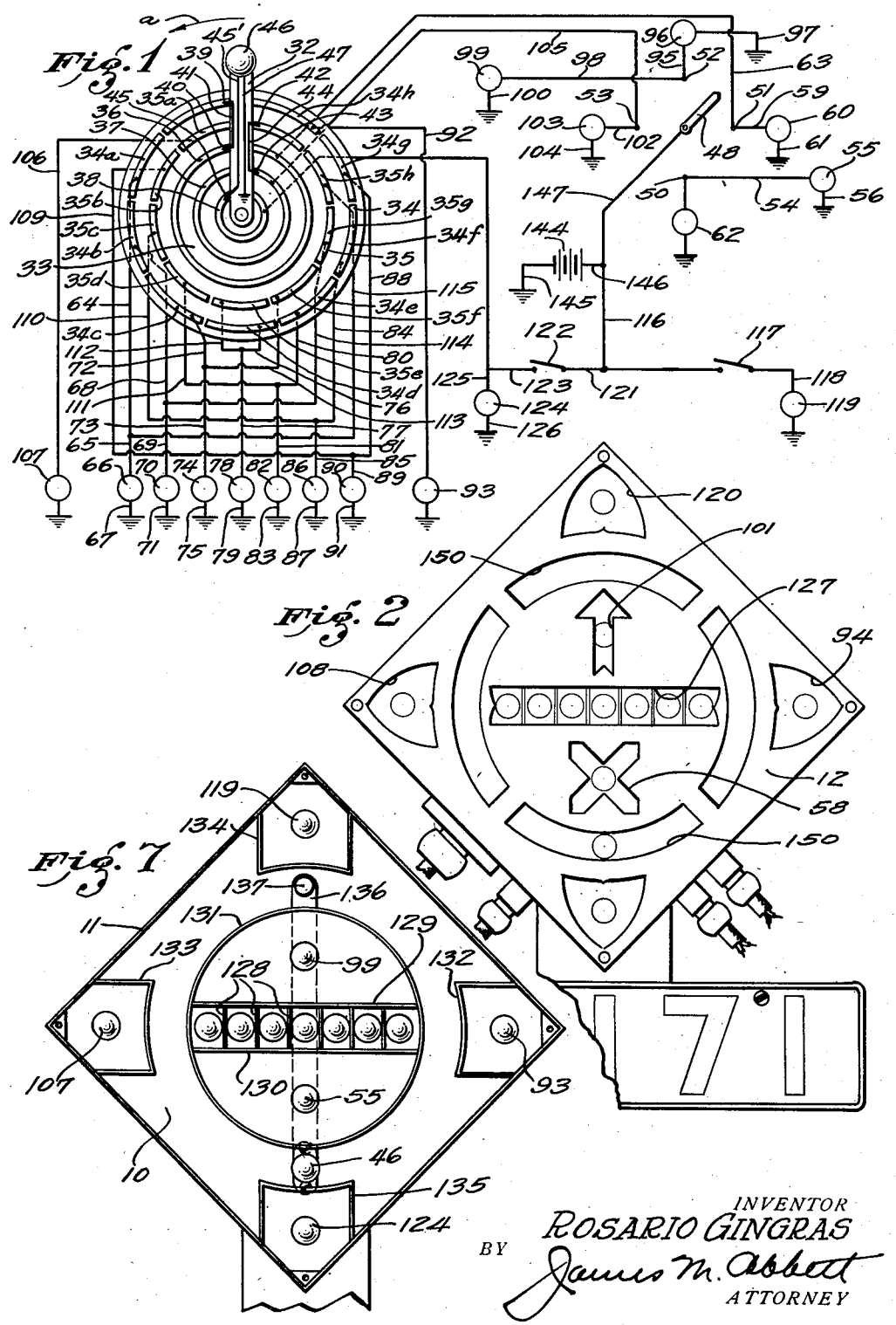
INVENTOR
ROSARIO GINGRAS
BY James M. Abbott
ATTORNEY July 27, 1937.  R. GINGRAS  2,088,370
AUTOMOBILE SIGNAL
Filed June 22, 1934  2 Sheets-Sheet 2
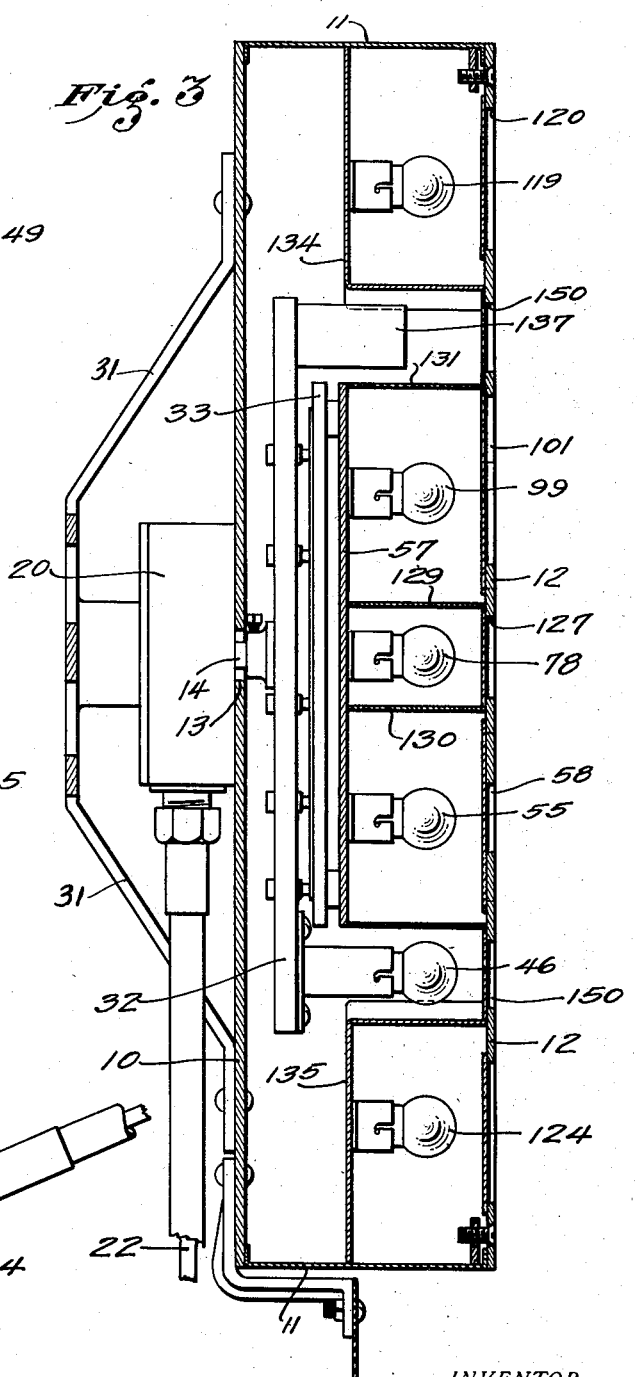
INVENTOR
ROSARIO GINGRAS
BY James N. Abbett
ATTORNEY Patented July 27, 1937

2,088,370

UNITED STATES PATENT OFFICE 2,088,370

AUTOMOBILE SIGNAL

Rosario Gingras, Los Angeles, Calif.

Application June 22, 1934, Serial No. 731,865

1 Claim. (Cl. 177—337)

This invention relates to a signal device, and particularly pertains to an automobile signal.

In the operation of automobiles it is desirable to provide optionally and automatically controlled means for indicating to pedestrians and other travelers on the highway the course of travel which an automobile is to pursue, the direction in which it is to turn, and other intended operations of manipulation of the vehicle. It is the principal object of the present invention therefor to provide indicating means upon an automobile, which means are optionally controlled by the driver, and by which the intended direction of turn of the automobile is indicated, the speed of turning, the speed of travel of the vehicle, and the intention of the driver to proceed at a relatively slower rate of speed, or to bring the vehicle to a complete stop.

The present invention contemplates the provision of an indicating signal disposed at a convenient place of operation upon a vehicle, preferably at the front and rear thereof, and which signal embodies right and left hand turn indicating lights, a series of lights to indicate the speed and direction of turning, a device for disclosing the relative rate of speed at which the vehicle is proceeding, and in addition to provide means for indicating an intended stop or slowing down of speed of the vehicle, or of said means being optionally controlled by the driver of the car.

The invention is illustrated by way of example in the accompanying drawings in which:

Figure 1 is a schematic view showing the wiring diagram of the various parts of the apparatus.

Fig. 2 is a view in elevation showing the face of the signal device.

Fig. 3 is a view in central vertical section through the signal device as seen on the line 3—3 of Fig. 2.

Fig. 4 is a view in transverse vertical section through the speed reducing gear as seen on the line 4—4 of Fig. 3.

Fig. 5 is a view in section and elevation showing the drive connection attached to the speedometer drive at the transmission.

Fig. 6 is a view in elevation showing the control switch for the various elements of the signal.

Fig. 7 is a view in elevation of the signal device with the front plate removed.

Referring more particularly to the drawings, 10 indicates the back plate of a signal box. This member is preferably square, and for present purposes is disposed with its opposite corners in vertical and horizontal planes and with the sides of the square all extending diagonally. Secured to and extending along the perimeter of the back plate 10 is a side plate 11 which forms a box like structure for the signaling apparatus. A cover plate 12 is disposed at the front of the signal box and is formed with a plurality of openings of the configuration and for purposes hereinafter disclosed. The back plate 10 is formed with a central opening 13 through which a shaft 14 extends. This shaft as shown in Fig. 4 of the drawings carries a worm wheel 15 in constant mesh with a worm gear 16. The worm gear shaft 17 is mounted in bearings 18 and 19 carried in a gear housing 20. One end of the shaft is fitted with a coupling 21 adapted to register with a complementary coupling carried by a flexible driving shaft or cable 22. This shaft or cable is fitted at its opposite end with a coupling 23 which carries a bevel gear 24 in mesh with a bevel gear 25, as shown in Fig. 5 of the drawings. The bevel gear 25 is mounted on a shaft 26 and is adapted to be held in engagement with the speedometer drive member of an automobile transmission by a coupling 27. A housing 28 encloses the gears 24 and 25 and a gear 29, which gear is provided with a coupling shaft 30 connected to the usual speedometer drive cable. It will thus be evident that by use of the attachment shown in Fig. 5 of the drawings the present structure and the speedometer may be driven off of the same transmission connection without reconstruction of any of the parts. The gear housing 20 is suitably supported upon a bracket 31 fixed on the back plate 10 of the signal box. Upon the forward end of the shaft 14 is mounted a commutator arm 32 which carries a plurality of commutator brushes, which will be hereinafter described. Disposed in a plane parallel to the plane of movement of the commutator arm 32 is a commutator disc 33. The commutator disc is fitted with concentric commutator rings 34, 35, 36, 37 and 38. These rings are divided into a series of segments for a purpose which will be hereinafter set forth. The rings 34 and 36 are capable of being electrically connected by brushes 39 and 40 carried by the commutator arm 32, and which brushes are connected together by a conductor 41. The commutator rings 35 and 37 are in contact with brushes 42 and 43 carried by the commutator arm 32 and connected by conductor 44. The commutator ring 38 is engaged by a brush 45 connected with the conductor 45' leading to a signal light 46 carried at the end of the commutator arm and which light is provided with a conductor 47 to complete its circuit to the ground. A source of electric energy is indicated at 144 in Fig. 1 of the drawings. One side of this source is connected to a ground wire 145 and the other side is connected to a lead wire 146. The lead wire 146 connects to a conductor 147, one end of which is secured to a switch blade 48 of a control switch 49, generally indicated in Fig. 6 of the drawings. The switch blade may be moved to suitable electrical connection with contacts 50, 51, 52 and 53. The contact 50 connects with a wire 54 leading to a "no pass" signal light 55. This light also connects with a ground wire 56. The no pass signal light is mounted upon the lamp panel 57 disposed within the signal box and upon the rear of which the commutator disc 33 is mounted. The no pass lamp is disposed in the rear of a stenciled opening 58 formed through the face plate 12 of the signal box, and shown in Fig. 2 as being in the configuration of the letter X. The contact 51 of the switch 49 connects with a conductor 59 leading to a "right" signal pilot light 60, the opposite side of which is provided with a ground wire 61. This pilot light is suitably mounted upon the instrument board of the vehicle for observation. A pilot light 62 is also provided to connect with the contact 50 of the no pass signal light. The contact 51 also connects with a conductor 63 which leads to the commutator ring 36 where a circuit is completed through commutator brush 40 to a commutator brush 39 through a conductor 41. The commutator brush 39 is in contact with the commutator ring 34, which ring is divided into a plurality of segments 34a, 34b, 34c, 34d, 34e, 34f, 34g, and 34h. The segment 34a connects with a conductor 64 which leads to a wire 65 attached to a lamp 66 which forms one of a series of "direction turn" indicating signals. This lamp is provided with a ground wire 67. The segment 34b connects with a conductor 68 leading to a wire 69 secured at one side to a second signal light 70, which is provided with a ground wire 71. The segment 34c is provided with a conductor 72 connected with a wire 73 leading to another of the "direction turn" lamps 74 provided with a conductor 75. The segment 34d is provided with a conductor 76 leading to a wire 77 connected with another of the "direction turn" lamps 78 provided with a conductor 79. The segment 34e is provided with a conductor 80 connected with a wire 81 leading to a signal turn lamp 82 and which is provided with a ground wire 83. The segment 34f is provided with a conductor 84 leading to a wire 85 and a direction turn lamp 86 having a ground wire 87. The segment 34g is connected with a conductor 88 leading to a wire 89 of a direction turn lamp 90 having a ground wire 91. The segment 34h is provided with a conductor 92 leading to a right signal lamp 93 mounted upon the lamp panel 57 and disposed in the rear of an opening 94 formed in the face plate 12 of the signal box, and here shown as being in the form of an arrow head and as being disposed at the right side of the signal box. The contact 52 of the control switch 49 connects through a wire 95 with a pilot light 96 having a ground wire 97. This pilot light indicates when a circuit from the contact 52 through a conductor 98 to a "pass" signal light 99 is established to a ground wire 100. The "no pass" and the "pass" signal lights 55 and 99, respectively, are disposed upon the lamp panel 57, the light 55 being in the rear of the display opening 58 and the light 99 being in the rear of a display opening 101. These lights are intended to be optionally and alternately used, the display opening 101 being in the form of a short arrow. It is also contemplated that the opening 58 shall be covered with a translucent red pane, and that the opening 101 shall be covered with a translucent green pane for purposes to be hereinafter set forth.

The contact 53 of the switch 49 leads to a conductor 102 of a pilot light 103 having a ground wire 104. A conductor 105 is also connected with this wire and leads to the commutator ring 37. The contact 53 controls a "left" turn signal. The commutator ring 37 is in constant contact with the brush 43 which establishes a current through conductor 44 to brush 42. This brush is in constant contact with a commutator ring 35 which is divided into a plurality of segments 35a, 35b, 35c, 35d, 35e, 35f, 35g, and 35h. The commutator segment 35a is provided with a conductor 106 which leads to a left signal light 107. This light is mounted upon the lamp panel 57 and is displayed in the rear of an opening 108 formed in the face plate 12 of the signal box and disposed at the left side of the signal face and diametrically opposite from the opening 94. The segment 35b is provided with a conductor 109 leading to wire 89 of signal turn lamp 91. The segment 35c is provided with a conductor 110 leading to wire 85 of signal light 86. The segment 35d is provided with conductor 111 connecting with wire 81 of signal light 82. The segment 35e is provided with conductor 112 leading to wire 77 of light 78. The segment 35f is provided with a conductor 113 leading to wire 73 of signal light 74. The segment 35g is provided with conductor 114 leading to wire 69 of signal lamp 71, and segment 35h is provided with conductor 115 leading to wire 65 of light 66.

The usual brake operated stop light is connected with lead wire 146 of the battery through wire 116 and is controlled by switch 117 through which a circuit is completed along wire 118 to the light 119 mounted at the top of the lamp panel 57, and disclosed at the rear of an opening 120 in the face plate 12, which opening is preferably covered by a translucent orange color pane. The lead wire 146 of the source of electric energy 144 also connects with a wire 121 leading to a tail light switch 122 and which switch is provided with a conductor 123 connected with a tail light 124 through a wire 125. The tail lamp is provided with a ground wire 126. The wire 123 also leads to commutator ring 38 which is in engagement with a commutator brush 45 completing a circuit through wires 45' and 47 and the rotating speed light 46.

The series of lights 66, 70, 74, 78, 82, 86, and 90, are mounted in a horizontal row on the light panel 57 and are separated by a partition 128. These lights are disclosed to view through a transversely extending opening 127 in the face plate 12 of the signal box and are adapted to be separately and successively illuminated to indicate the direction in which the vehicle is turning and the speed of turning.

Referring particularly to Fig. 7, it will be seen that the various lights are disposed in separate compartments so that their rays will only be visible through the light opening in the face plate 12. The series of lights previously described as being separated by a partition 128 are also enclosed by horizontal partitions 129 and 130. A circular wall member 131 encompasses this row of lights and also the "pass" and "no pass" lights 99 and 55 respectively. The right hand signal light 93 is enclosed by a wall 132. A left hand signal light 107 is enclosed by a wall 133. The brake light 119 is enclosed by a wall 134. The tail light 124 is enclosed by a wall 135, while the entire structure is enclosed by the signal box side wall 11. It will be understood that the various light units may be separately constructed and applied at different points on the vehicle, if desired, or that they may be grouped in any desired arrangement, for example, the right and left hand turn lights and the turn indicating lights may be assembled in a separate case.

In order to insure that the rotating arm 32 will move at a uniform speed it is extended upon the opposite side of its axis of rotation as indicated at 136, where it is provided with a counter weight 137 which will counterbalance the weight of the socket of the rotating signal light 46.

In operation of the present invention the signal box is mounted in a suitable position upon the vehicle, particularly at the rear end thereof, so that it will be conveniently displayed to oncoming traffic from the rear. The wiring is so arranged as to connect the various elements of the device with the optionally controlled switch 49, the brake switch 117, and the tail light switch 122. The brake switch 117 will be momentarily closed when the service brake is applied. The tail light switch 122 may be closed at any time, and will at the same time close the circuit from the source of electrical energy 144 through conductors 146 and 116 to conductor 121, thence through the switch 122 to the conductor 123, and therealong to the commutator ring 38. The circuit will then be completed to the rotating tail light 46 along commutator brush 45, conductors 45' and 47 to the ground. Since the rotating commutator arm 32 is being continuously driven through shaft 22 from the transmission it will be evident that the light 46 will be visible through a series of circumferentially arranged arcuate windows 150. Thus it will be possible for a person following the car to approximately estimate the speed at which the vehicle is traveling. In the event that the driver of the vehicle intends to turn to the right he manipulates the switch 48 to establish a circuit from the source of electric energy 144 through wire 147 to the switch 48 and then to contact 51. This completes a circuit through the pilot tail light 60 and also through conductor 63 which leads to commutator ring 36 of the commutator 33. This ring is engaged by brush 40 connected by a wire 41 with the brush 49 which contacts with the commutator ring 34. The commutator ring 34 has been described as being formed with a series of commutator segments 34a to 34h inclusive. As the commutator arm 32 rotates in the direction of the arrow "a" these segments will be successively contacted and will cause the signal lights 66, 70, 74, 78, 82, 86, and 90, to be successively lighted for a period of time represented by the travel of the brush 39 across the particular segment. When the brush 39 reaches the segment 34h the right hand signal light 93 will be illuminated. In the event that a left hand turn is to be negotiated the set of turn signal lights will be illuminated in reverse order to that just described and will finally illuminate the left hand signal 107. In the event that an automobile approaching from the rear signals to pass and the driver of the car to whom the signal is made finds it impossible to relinquish the right of way he throws the switch member 48 to engage the contact 50. This will complete a circuit through the no pass lamp 55 and will illuminate the opening 58. This will indicate to the oncoming car that he should not attempt to pass, and in view of the fact that the opening 58 is in the form of an X and is covered with a red colored pane of translucent material a warning signal will be made. If on the other hand the road is clear and the driver of the car proposes to yield the right of way the switch member 48 is moved to make electrical connection with the contact 52. This will illuminate the lamp 99 and will in turn cause the signal opening 101 to be illuminated, and since this is an arrow having a green pane of glass over it a signal will be made appropriately indicating that the car may pass.

It will thus be seen that by the signal device here disclosed a tail light will be provided, means will be provided for automatically indicating the speed at which a car is traveling, the speed and direction in which it is turning, and in addition selective means will be provided to signal an oncoming car as to whether or not it will be given the right of way on the highway.

While I have shown the preferred form of my invention, as now known to me, it will be understood that various changes may be made in the combination, construction, and arrangement of parts, by those skilled in the art, without departing from the spirit of the invention as claimed.

Having thus described my invention what I claim and desire to secure by Letters Patent is:

An automobile signal comprising a housing having a front plate thereon formed with a horizontally extending slotted opening at the opposite ends of which is a separate opening, a circular slotted opening formed in said plate, a plurality of commutator segments arranged in concentric rows and carried within the housing, a contact arm rotatably mounted within the housing and adapted to pass over the faces of said commutator segments, a lamp carried by said contact arm and adapted to be observed through the slotted opening in the housing, said arm being continuously driven by the automobile engine, lamp houses, one disposed in the rear of each of the opposite end openings in the housing plate, a lamp house having a plurality of separate compartments disposed in the rear of the horizontally slotted opening of the housing plate, a lamp disposed in each of said compartments, electric circuits including the various commutator segments and said lamps, and arranged to consecutively illuminate the lamps in sequence from one end of the slotted opening thereacross and the adjacent end lamp, a selecting switch for preparing the circuits included with each of said sets of commutator rings whereby the lamps may be selectively illuminated in opposite sequence, and a switch for closing the circuit of the lamp on the commutator arm whereby said circuit will be maintained constantly closed as the commutator arm rotates.

ROSARIO GINGRAS.